United States Patent
Luo et al.

(10) Patent No.: US 8,373,945 B1
(45) Date of Patent: Feb. 12, 2013

(54) MAGNETIC WRITER HAVING A SPLIT YOKE

(75) Inventors: Peng Luo, Fremont, CA (US); Zhigang Bai, Fremont, CA (US); Yugang Wang, Milpitas, CA (US); Kroum S. Stoev, Pleasanton, CA (US); Francis H. Liu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 912 days.

(21) Appl. No.: 11/789,190

(22) Filed: Apr. 23, 2007

(51) Int. Cl.
*G11B 5/31* (2006.01)
*G11B 5/17* (2006.01)

(52) U.S. Cl. .......... 360/125.07; 360/123.11; 360/125.04

(58) Field of Classification Search .......... 360/123.01–123.61, 125.01–125.75
See application file for complete search history.

(56) References Cited

U.S. PATENT DOCUMENTS

| | | | |
|---|---|---|---|
| 5,095,397 A * | 3/1992 | Nagata et al. | 360/318 |
| 5,452,168 A | 9/1995 | Nepela et al. | |
| 5,995,342 A | 11/1999 | Cohen et al. | |
| 6,275,354 B1 | 8/2001 | Huai et al. | |
| 6,542,331 B1 | 4/2003 | Chang et al. | |
| 6,771,463 B2 | 8/2004 | Kamijima | |
| 6,972,932 B2 | 12/2005 | Shukh et al. | |
| 2006/0050432 A1 | 3/2006 | Lee et al. | |

* cited by examiner

*Primary Examiner* — Craig A. Renner
*Assistant Examiner* — Gustavo Polo

(57) ABSTRACT

A method and system for providing a magnetic transducer are described. The magnetic transducer includes a first pole, a write gap, a second pole, a first coil, and a second coil. The first pole has a front portion on which at least a portion of the write gap resides. The second pole includes a split yoke that includes a first portion and a second portion. At least a portion of the first coil resides between the first portion of the split yoke and the first pole. At least a portion of the second coil resides between the second portion of the split yoke and the first pole.

20 Claims, 6 Drawing Sheets

MAGNETIC WRITER HAVING A SPLIT YOKE

BACKGROUND

In order to write data to and read data from a media, a recording head is typically used. FIGS. 1 and 2 depict side and perspective views of portion of a conventional perpendicular magnetic recording (PMR) head 10. For simplicity, only the write transducer 20 is shown in FIGS. 1 and 2. In addition, for clarity, FIGS. 1 and 2 are not drawn to scale. Although only the write transducer 20 is shown, the conventional write transducer 20 is generally part of a merged head that includes the transducer for writing, a read transducer for reading data from the media, and a slider. In addition, for clarity, only the conventional second pole (P2) 30 and the PMR write pole 32 are depicted in FIG. 2.

The conventional PMR head 10 includes a conventional first pole (P1) 22, insulator 24, a first coil 26, P1 pad 28, the conventional P2 30, the conventional PMR write pole (or main pole) 32, insulator 24, write gap 36, a shield pad 34, a second coil 38, and shield 40. The conventional P2 30 has a length perpendicular to the ABS that is on the order of thirteen to sixteen micrometers. Although not explicitly shown, seed layer(s) may be used in providing the conventional poles 22, 30, and 32. The conventional PMR write transducer 20 is also depicted with two coils 26 and 38. However, PMR heads having a single coil are also typically used.

In order to write data to a PMR media, the coils 26 and 38 are energized. Consequently, the conventional P2 and 30 conventional PMR pole 32 are magnetized and the media written by flux from the pole tip of the conventional PMR pole 32. Based on the direction of current through the coils 26 and 38, the direction of magnetic flux through the conventional PMR pole 32 changes. Thus, bits having opposing magnetization can be written and the desired data stored on the PMR media.

Although the conventional PMR head 10 functions, there are drawbacks. The conventional PMR head 10 may suffer from a low field rise time. A low field rise time may result, at least in part, from the inductance of the conventional head 10. This large inductance increases the time for the current through the coils 26 and 38 to change as well as the time for the corresponding magnetic field to be generated by the poles 22, 30, and 32. Consequently, write speed may be adversely affected. As a result, the conventional PMR head 10 may be unsuitable for use at higher data rates.

The conventional PMR head 10 may also be subject write pole tip protrusion, which adversely affects disk drive reliability. During use, a write current is driven through the coils 26 and 38. Write currents in the coils 26 and 38, and other currents such as eddy currents in the core of the conventional write transducer 20, may heat the conventional write transducer 20. The relatively large resistance of the coil(s) 26 and 38 may exacerbate this heating, particularly in the region of the conventional PMR pole 32 and conventional P2 30. The conventional P1 22, conventional P2 30, conventional PMR pole 32, and conventional shield 40 typically have large positive coefficients of thermal expansion in comparison to the insulator 24 and write gap 36. When heated, therefore, the tips of P1 22, the conventional PMR pole 32, and the shield 40 near the ABS expand, protruding outward toward the ABS. The protrusion of these components 22, 32, and 40 is known as pole tip protrusion. This pole tip protrusion adversely impacts the reliability of disk drives using the conventional PMR head 10 because a protruding pole is more likely to contact the media during operation.

In addition, the conventional P2 30 has may have domains (not explicitly shown) that are not aligned parallel to the ABS. Instead, the P2 30 may have a complicated domain structure, with domains aligned in a variety of directions. Thus, the domains in the conventional P2 30 may be more difficult to align in the desired direction for recording. Consequently, performance of the conventional PMR head 10 may be adversely affected, particularly at high data rates.

Accordingly, what is needed is a system and method for improving the performance and reliability of the conventional PMR head 10, particularly at higher data rates.

BRIEF SUMMARY OF THE INVENTION

A method and system for providing a magnetic transducer are disclosed. The magnetic transducer comprises a first pole, a write gap, a second pole, a first coil, and a second coil. The first pole has a front portion on which at least a portion of the write gap resides. The second pole includes a split yoke that includes a first portion and a second portion. At least a portion of the first coil resides between the first portion of the split yoke and the first pole. At least a portion of the second coil resides between the second portion of the split yoke and the first pole.

DETAILED DESCRIPTION OF THE PREFERRED EMBODIMENTS

Figure 1:
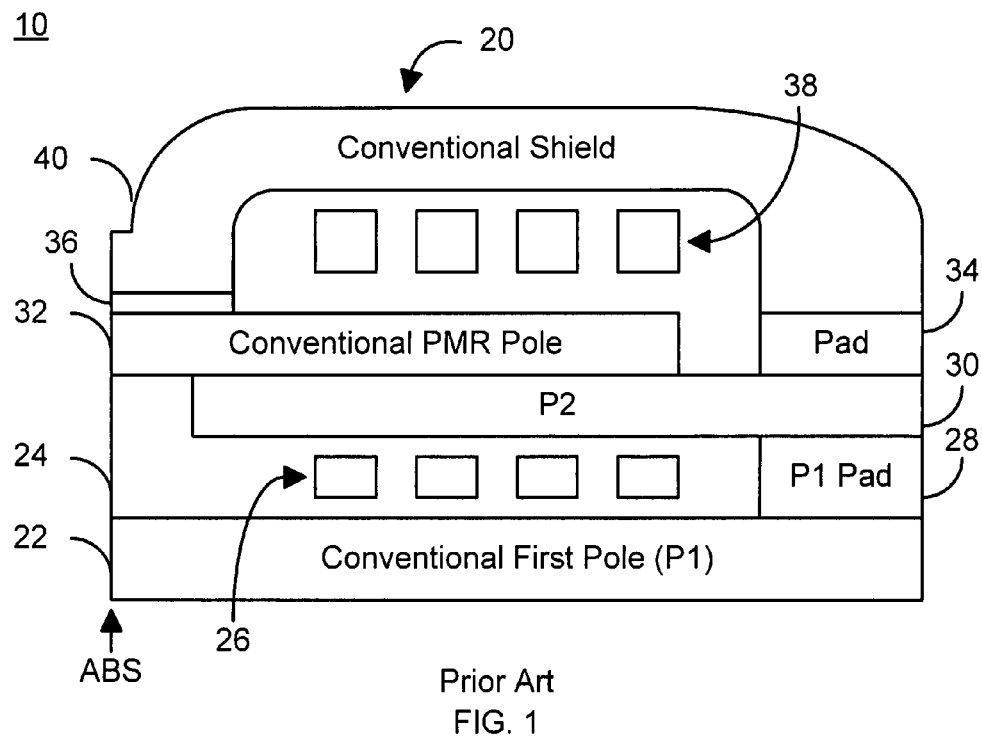
FIG. 1 is a diagram depicting a side view of a conventional PMR write head.
Figure 2:
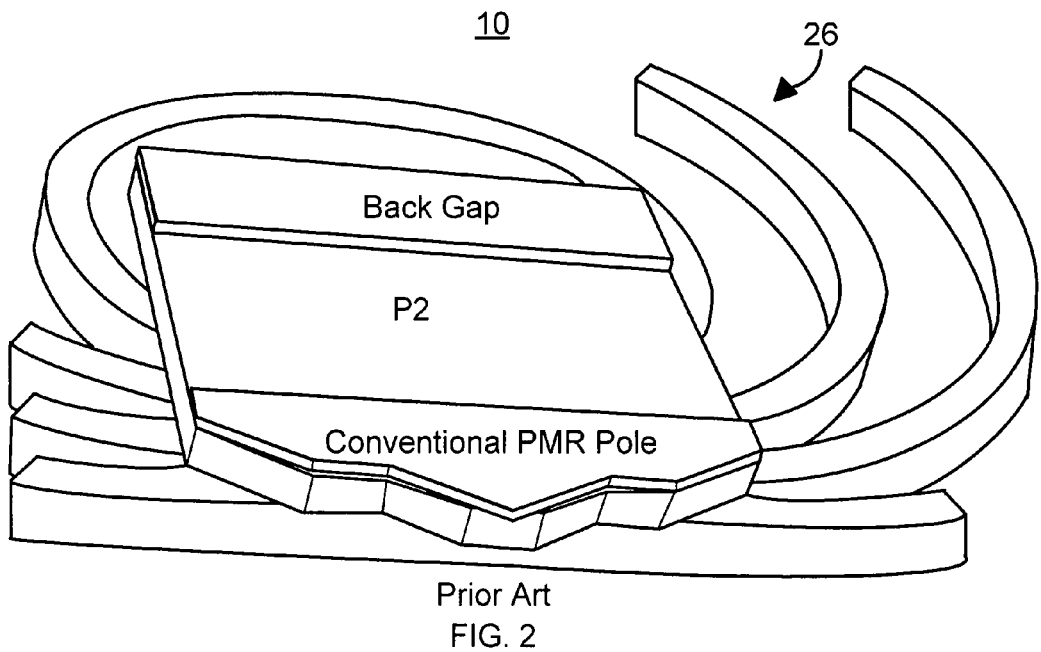
FIG. 2 is a diagram depicting a perspective view of a conventional PMR write head.
Figure 3:
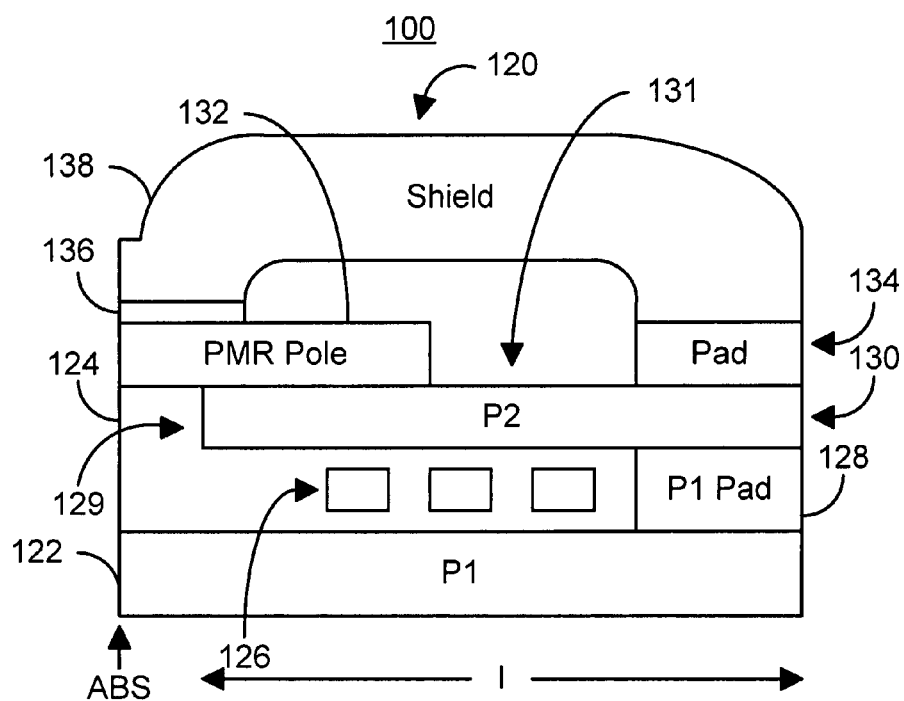
FIG. 3 is a diagram depicting a side view of an exemplary embodiment PMR write head.
Figure 4:
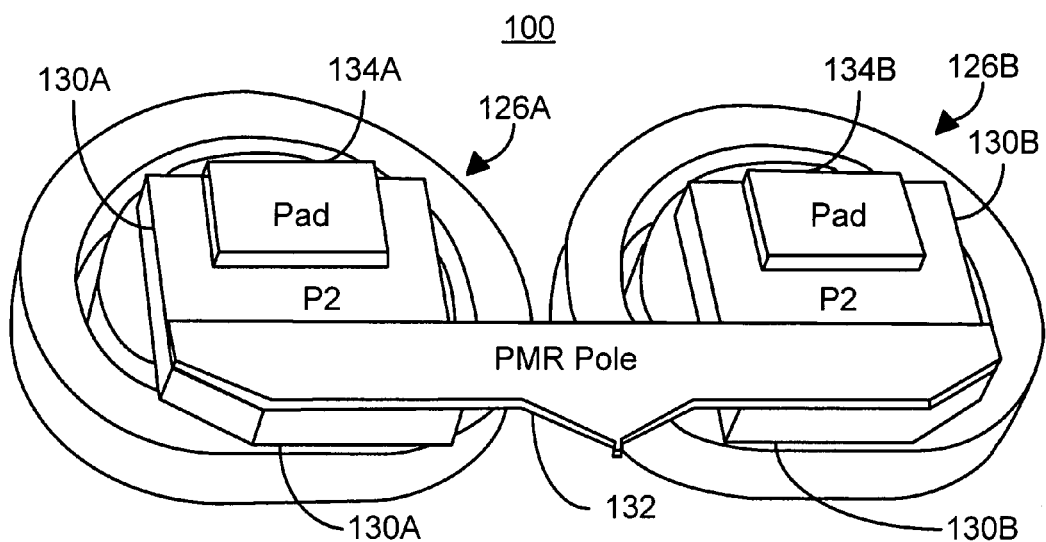
FIG. 4 is a diagram depicting a perspective view of an exemplary embodiment of a PMR write head.

FIGS. 3 and 4 depict an exemplary embodiment of a portion of a PMR head 100. FIG. 3 is a side view of the PMR head 100, while FIG. 4 is a perspective view of the PMR head 100. For simplicity, only a write transducer 120 is depicted in FIG. 3 and only a portion of the write transducer 120 is depicted in FIG. 4. For clarity, FIGS. 3 and 4 are not drawn to scale. The PMR head 100 is preferably used as a write head in a merged head including at least the PMR head 100 and a read head (not shown).

The PMR head 100 includes a first pole P1 122, insulator 124, a coil 126, optional P1 pad 128, a second pole P2 130, the PMR write pole (or main pole) 132, write gap 136, an optional shield pad 134, and an optional shield 138. Although not explicitly shown, seed layer(s) may be used in providing the poles 122, 130, and 132. The PMR write transducer 120 is also depicted with a single split coil 126. However, in an alternate embodiment, the PMR head 100 may utilize an additional coil that is not coplanar with the split coil 126, for example between P2 130 and the shield 138. Such an additional coil (not shown) would preferably be a split coil.

The P2 130 includes a front 129 and a yoke 131. In the embodiment shown, the P2 130 has been split into portions 130A and 130B. Thus, the P2 130 has a split yoke. Stated differently, the yoke 131 is also split into two portions. Consequently, the pad 134 is also split into two portions 134A and 134B. In addition, the P2 130 has a shortened yoke length, l, measured horizontally in FIG. 3. In one embodiment, the yoke length is at least four micrometers, but not more than eight micrometers. In another embodiment, the yoke length is not more than six micrometers.

The shield 138 is used in the embodiment depicted in FIGS. 3 and 4. However, in an alternate embodiment, the shield 138 may be omitted. In addition, shield 138 may take different forms. For example, the shield 138 might be a floating shield that may reside in the region of the ABS, but not extend to the backgap region of the PMR head 100. In the embodiment shown, the shield 138 is depicted as a single piece. However, in another embodiment, the shield 138 may be a split shield having two portions, in a manner similar to the split yoke P2 130 and the pad 134. Consequently, the shield 138 may be configured based on the split yoke P2 130.

In addition, each portion 130A and 130B of the yoke 131 (and P2 130) has a separate coil 126A and 126B, respectively. Consequently, the coil 126 is also a split coil, composed of two coils 126A and 126B. Because the yoke length of the P2 130 is reduced, the diameter and, therefore, overall length of each of the coils 126A and 126B may also be reduced. The resistance of the split coil 126 may be reduced. Furthermore, the coils 126A and 126B are configured such that each coil 126A and 126B generates a magnetic field in the same direction in the corresponding portions 130A and 130B, respectively, of the P2 130. Thus, the coils 126A and 126B of the split coil 126 operate together to magnetize the PMR pole 132 in the same direction. Consequently, the PMR pole 132 may still write the desired data to the media (not shown).

In operation, the split coil 126 is energized. Current is driven through coils 126A and 126B such that magnetic fields in the same direction are generated. Consequently, the portions 130A and 130B of the split yoke P2 130 are magnetized in the same direction at P2 130 and the PMR pole 132. In addition, the PMR pole 132 is magnetized and the media written by flux from the pole tip of the PMR pole 132. Based on the direction of current through the coils 126A and 126B of the split coil 126, the direction of magnetic flux through the PMR pole 132 changes. Thus, bits having opposing magnetization can be written and the desired data stored on the PMR media.

The PMR head 100 may be more suitable for use at high data rates and may have improved reliability. Because the P2 130 has a split yoke including portions 130A and 130B, a split coil 126 including coils 126A and 126B is used. Consequently, the inductance of the P2 130 and split coil 126 may be reduced. As a result, the rise time of the current in the split coil 126 and the field rise time in the P2 130 may be reduced. Consequently, higher data rates, for example beyond one gigabit per second, may be achieved. The shortened yoke length of the P2 130 may also result in domains in the portions 130A and 130B that favor alignment parallel to the ABS. Consequently, the portions 130A and 130B may have a simpler domain structure. This domain structure may make the P2 130 and thus the PMR pole 132 easier to magnetize in the desired direction for writing to the media (not shown). Consequently, the PMR head 100 may have a superior dynamic response, particularly at a high data rate. In addition, the split coil 126 may have a reduced resistance. As a result, heating in the PMR head 100 may be reduced. A reduction in heating may result in reduced pole tip protrusion. Thus, reliability of the PMR head may be improved. The PMR head 100, therefore, may have improved ability to be used at a high data rate and improved reliability.

Figure 5:
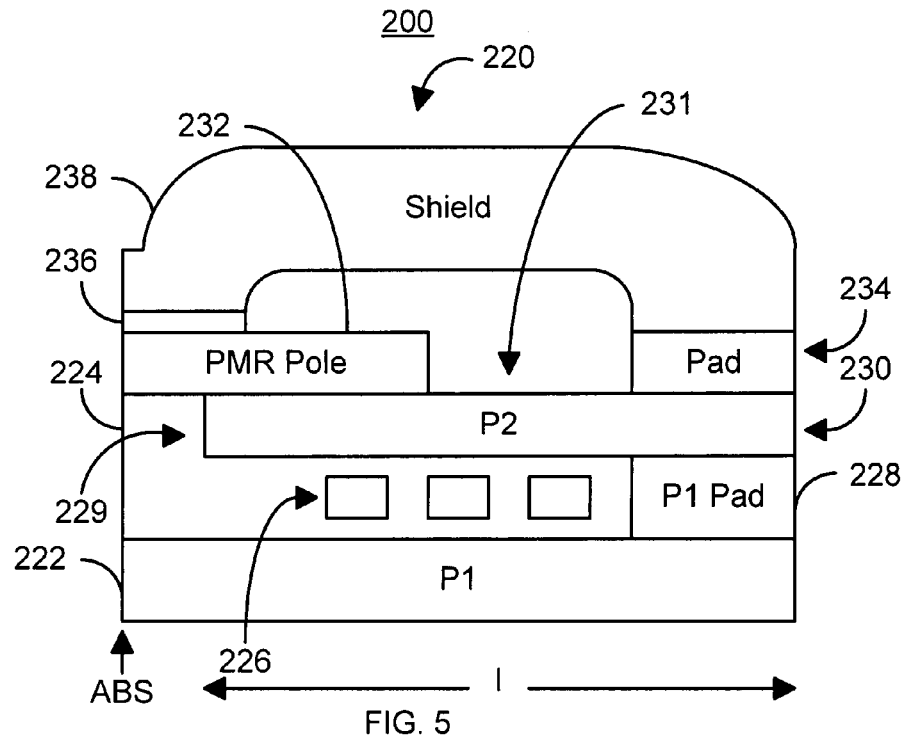
FIG. 5 is a diagram depicting a side view of another exemplary embodiment PMR write head.
Figure 6:
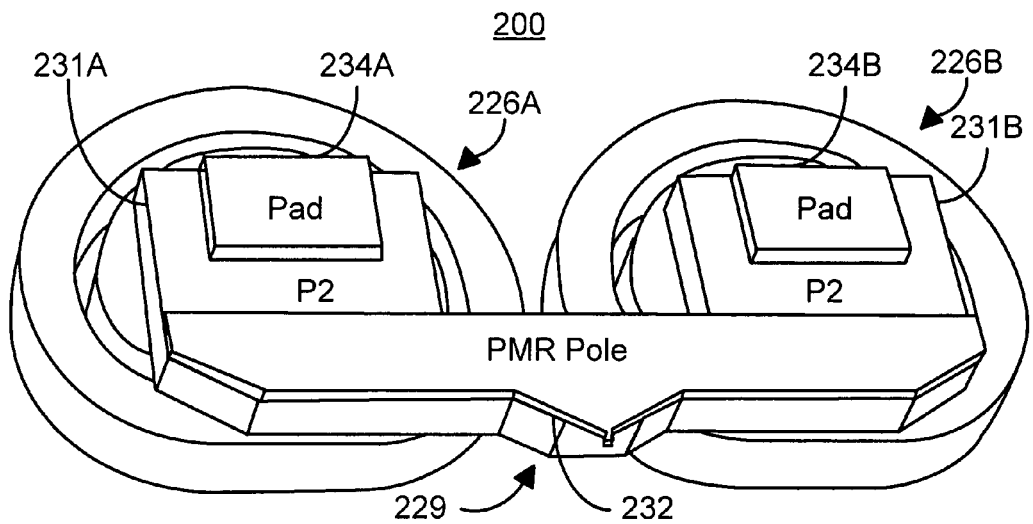
FIG. 6 is a diagram depicting a perspective view of another exemplary embodiment of a PMR write head.

FIGS. 5 and 6 depict another exemplary embodiment of a portion of a PMR head 200. FIG. 5 is a side view of the PMR head 200, while FIG. 6 is a perspective view of the PMR head 200. For simplicity, only a write transducer 220 is depicted in FIG. 5 and only a portion of the write transducer 220 is depicted in FIG. 6. For clarity, FIGS. 5 and 6 are not drawn to scale. The PMR head 200 is preferably used as a write head in a merged head including at least the PMR head 200 and a read head (not shown).

The PMR head 200 is analogous to the PMR head 100. Consequently, analogous components are labeled similarly. The PMR head 200 thus includes a P1 222, insulator 224, a split coil 226, optional P1 pad 228, a split yoke P2 230, the PMR pole 232, an optional shield pad 234, a write gap 236, and an optional shield 238. Although not explicitly shown, seed layer(s) may be used in providing the poles 222, 230, and 232. The PMR write transducer 220 is also depicted with a single split coil 226. However, in an alternate embodiment, the PMR head 200 may utilize an additional coil that is not coplanar with the split coil 226, for example between P2 230 and the shield 238. Such an additional coil (not shown) would preferably be a split coil.

The P2 230 includes a front 229 and a yoke 231. In the embodiment shown, the front 229 of P2 230 is joined, while the yoke 231 has been split into portions 231A and 231B. Thus, the P2 230 has a split yoke. However, unlike the P2 130 depicted in FIGS. 3 and 4, the P2 230 is not completely split into two sections. Because the yoke 231 is split into portions 231A and 231B, the pad 234 is also split into two portions 234A and 234B. In addition, the P2 230 has a shortened yoke length, l, measured horizontally in FIG. 5. In one embodiment, the yoke length is at least four micrometers, but not more than eight micrometers. In another embodiment, the yoke length is not more than six micrometers.

The shield 238 is used in the embodiment depicted in FIGS. 5 and 6. However, in an alternate embodiment, the shield 238 may be omitted. In addition, shield 238 may take different forms. For example, the shield 238 might be a floating shield that may reside in the region of the ABS, but not extend to the backgap region of the PMR head 200. In the embodiment shown, the shield 238 is depicted as a single piece. However, in another embodiment, the shield 238 may be a split shield having two rear portions, in a manner similar to the split yoke P2 230 and the pad 234. Consequently, the shield 238 may be configured based on the split yoke P2 230.

In addition, each portion 231A and 231B of the yoke 231 has a separate coil 226A and 226B, respectively, that may be considered part of the split coil 226. Because the yoke length of the P2 230 is reduced, the diameter and, therefore, overall length of each of the coils 226A and 226B may also be reduced. The resistance of the split coil 226 may be reduced. Furthermore, the coils 226A and 226B are configured such that each coil 226A and 226B generates a magnetic field in the same direction in the corresponding portions 231A and 231B, respectively, of the yoke 231. Thus, the coils 226A and 226B of the split coil 226 operate together to magnetize the PMR pole 232 in the same direction. Consequently, the PMR pole 232 may still write the desired data to the media (not shown).

The PMR head 200 operates in an analogous manner to the PMR head 100. In order to write data to the media (not shown), the split coil 226 is energized. Current is driven through coils 226A and 226B such that magnetic fields in the same direction at P2 230 and the PMR pole 232 are generated. Consequently, the portions 231A and 231B of the split yoke 231 are magnetized in the same direction. Thus, the PMR pole 232 is magnetized and the media written by flux from the pole tip of the PMR pole 232. Based on the direction of current through the coils 226A and 226B, the direction of magnetic flux through the PMR pole 232 changes. Thus, bits having opposing magnetization can be written and the desired data stored on the PMR media.

For reasons analogous to those discussed above with respect to the PMR head 100, the PMR head 200 may be more suitable for use at high data rates and may have improved reliability. In particular, the field rise time, dynamic response time, and pole tip protrusion may be reduced. Consequently, higher data rates, for example beyond one gigabit per second, may be achieved. The PMR head 200, therefore, may have improved ability to be used at a high data rate and improved reliability.

Figure 7:
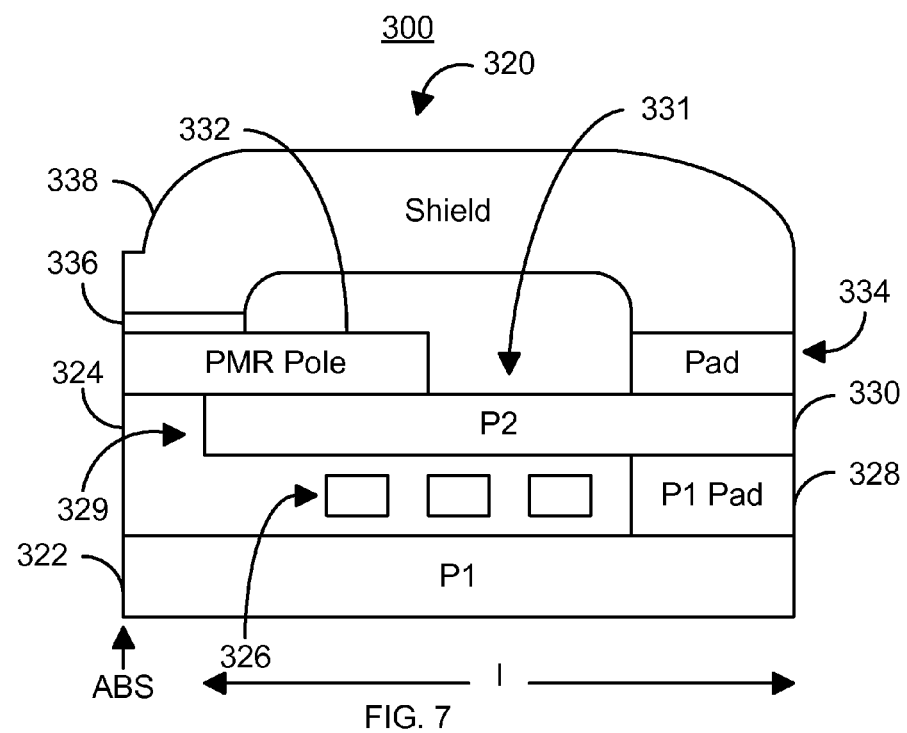
FIG. 7 is a diagram depicting a side view of another exemplary embodiment PMR write head.
Figure 8:
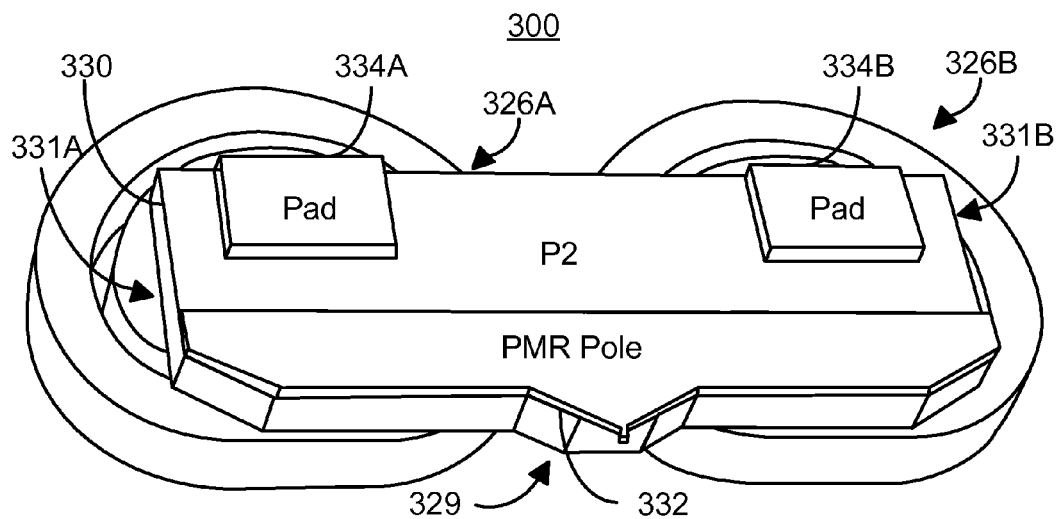
FIG. 8 is a diagram depicting a perspective view of another exemplary embodiment of a PMR write head.

FIGS. 7 and 8 depict another exemplary embodiment of a portion of a PMR head 300. FIG. 7 is a side view of the PMR head 300, while FIG. 8 is a perspective view of the PMR head 300. For simplicity, only a write transducer 320 is depicted in FIG. 7 and only a portion of the write transducer 320 is depicted in FIG. 8. For clarity, FIGS. 7 and 8 are not drawn to scale. The PMR head 300 is preferably used as a write head in a merged head including at least the PMR head 300 and a read head (not shown).

The PMR head 300 is analogous to the PMR head 100. Consequently, analogous components are labeled similarly. The PMR head 300 thus includes a P1 322, insulator 324, a split coil 326, optional P1 pad 328, a P2 330, the PMR write pole 332, an optional shield pad 334, a write gap 336, and an optional shield 338. Although not explicitly shown, seed layer (s) may be used in providing the poles 322, 330, and 332. The PMR write transducer 320 is also depicted with a single split coil 326. However, in an alternate embodiment, the PMR head 300 may utilize an additional coil that is not coplanar with the split coil 326, for example between P2 330 and the shield 338. Such an additional coil (not shown) would also preferably be a split coil.

The P2 330 includes a front 329 and a yoke 331. In the embodiment shown, both the front 329 and the yoke 331 of P2 330 are joined. In addition, the P2 330 has a shortened yoke length, l, measured horizontally in FIG. 7. In one embodiment, the yoke length is at least four micrometers, but not more than eight micrometers. In another embodiment, the yoke length is not more than six micrometers.

The shield 338 is used in the embodiment depicted in FIGS. 7 and 8. However, in an alternate embodiment, the shield 338 may be omitted. In addition, shield 338 may take different forms. For example, the shield 338 might be a floating shield that may reside in the region of the ABS, but not extend to the backgap region of the PMR head 300. In the embodiment shown, the shield 338 is depicted as a single piece. However, in another embodiment, the shield 338 may be a split shield having two rear portions, in a manner similar to the pad 334. Consequently, the shield 338 may be configured based on the pad 334.

The split coil 326 includes two coils 326A and 326B. Because the yoke length of the P2 330 is reduced, the diameter and, therefore, overall length of each of the coils 326A and 326B may also be reduced. The resistance of the split coil 326 may be reduced. Furthermore, the coils 326A and 326B are configured such that each coil 326A and 326B generates a magnetic field in the same direction in the corresponding portions 331A and 331B, respectively, of the yoke 331. Thus, the coils 226A and 326B of the split coil 326 operate together to magnetize the PMR pole 332 in the same direction. Consequently, the PMR pole 332 may still write the desired data to the media (not shown).

The PMR head 300 operates in an analogous manner to the PMR head 100. In order to write data to the media (not shown), the split coil 326 is energized. Current is driven through coils 326A and 326B such that magnetic fields in the same direction at P2 330 and the PMR pole 332 are generated. Consequently, the PMR pole 332 is magnetized and the media written by flux from the pole tip of the PMR pole 332. Based on the direction of current through the coils 326A and 326B, the direction of magnetic flux through the PMR pole 332 changes. Thus, bits having opposing magnetization can be written and the desired data stored on the PMR media.

For reasons similar to those discussed above with respect to the PMR heads 100 and 200, the PMR head 300 may be more suitable for use at high data rates and may have improved reliability. In particular, the field rise time, dynamic response time, and pole tip protrusion may be reduced. Consequently, higher data rates, for example beyond one gigabit per second, may be achieved. The PMR head 300, therefore, may have improved ability to be used at a high data rate and improved reliability.

Figure 9:
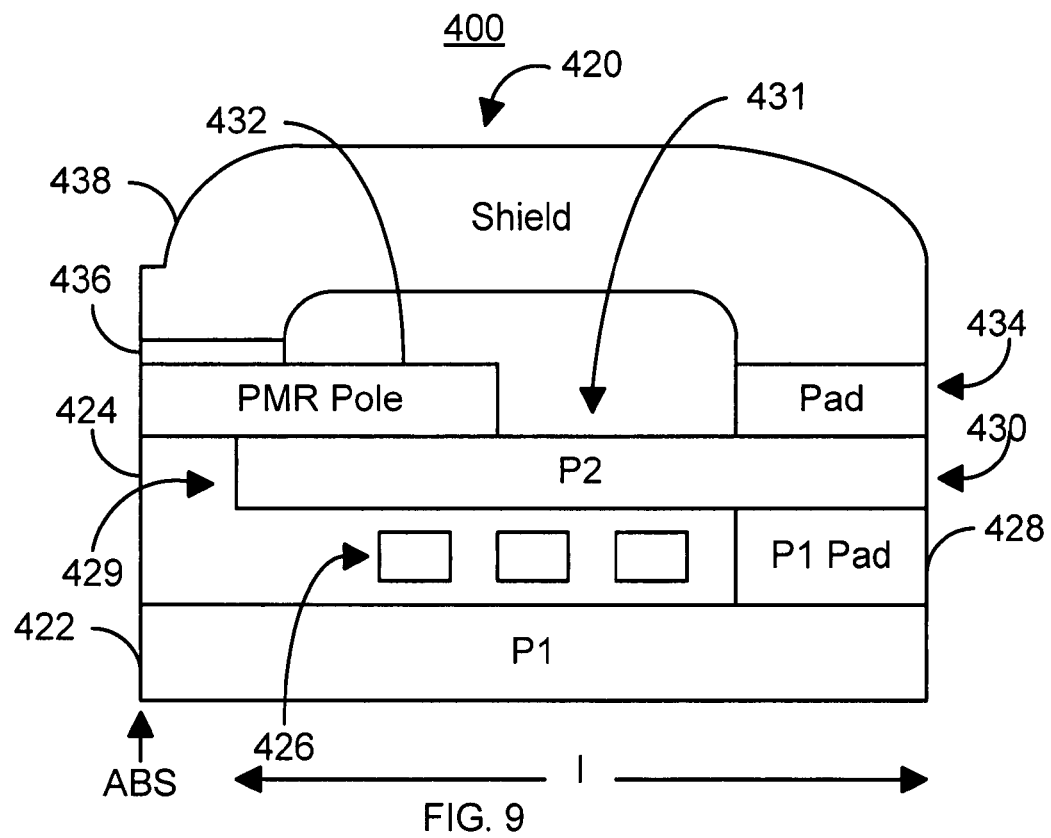
FIG. 9 is a diagram depicting a side view of another exemplary embodiment PMR write head.
Figure 10:
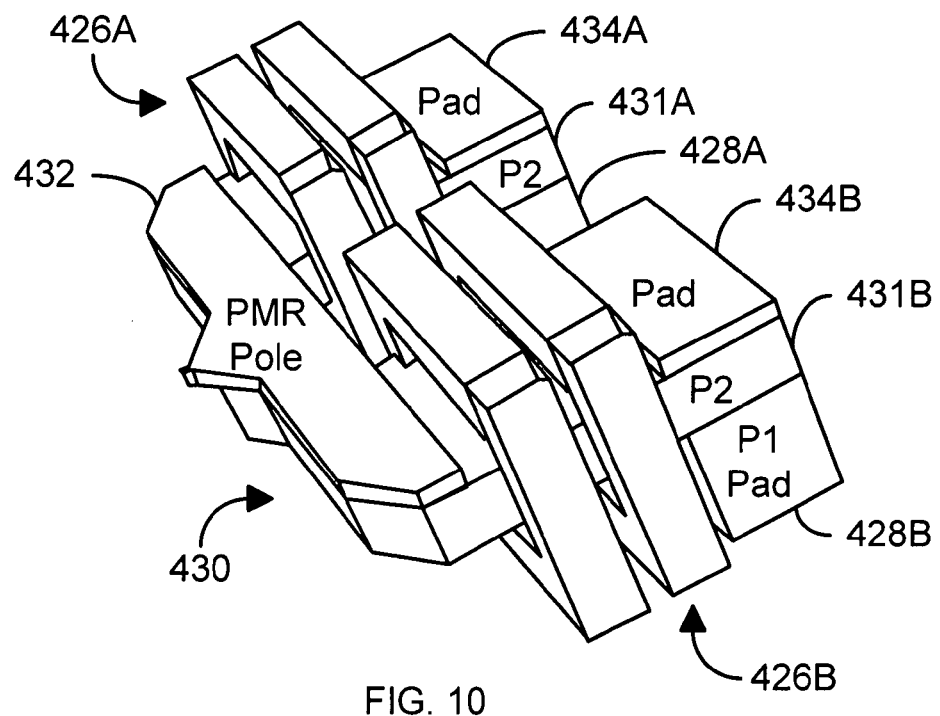
FIG. 10 is a diagram depicting a perspective view of another exemplary embodiment of a PMR write head.

FIGS. 9 and 10 depict another exemplary embodiment of a portion of a PMR head 400. FIG. 9 is a side view of the PMR head 400, while FIG. 10 is a perspective view of the PMR head 400. For simplicity, only a write transducer 420 is depicted in FIG. 9 and only a portion of the write transducer 420 is depicted in FIG. 10. For clarity, FIGS. 9 and 10 are not drawn to scale. The PMR head 400 is preferably used as a write head in a merged head including at least the PMR head 400 and a read head (not shown).

The PMR head 400 is analogous to the PMR head 200. Consequently, analogous components are labeled similarly. The PMR head 400 thus includes a P1 422, insulator 424, a split coil 426, optional P1 pad 428, a split yoke P2 430, the PMR pole 432, an optional shield pad 434, a write gap 436, and an optional shield 438. Although not explicitly shown, seed layer(s) may be used in providing the poles 422, 430, and 432.

The P2 430 includes a front 429 and a yoke 431. In the embodiment shown, the front 429 of P2 430 is joined, while the yoke 431 has been split into portions 431A and 431B. Thus, the P2 430 has a split yoke that is analogous to the P2 230 depicted in FIGS. 5 and 6. In another embodiment, the P2 430 may have a yoke 431 that is not joined at the front. In such an embodiment, the P2 230 would be analogous to that depicted in FIGS. 3 and 4. Referring back to FIGS. 9 and 10, because the yoke 431 is split into portions 431A and 431B, the pad 434 is also split into two portions 434A and 434B. In addition, the P2 430 has a shortened yoke length, l, measured horizontally in FIG. 9. In one embodiment, the yoke length is at least four micrometers, but not more than eight micrometers. In another embodiment, the yoke length is not more than six micrometers.

The shield 438 is used in the embodiment depicted in FIGS. 9 and 10. However, in an alternate embodiment, the shield 438 may be omitted. In addition, shield 438 may take different forms. For example, the shield 438 might be a floating shield that may reside in the region of the ABS, but not extend to the backgap region of the PMR head 400. In the embodiment shown, the shield 438 is depicted as a single piece. However, in another embodiment, the shield 438 may be a split shield having two rear portions, in a manner similar to the split yoke P2 430 and the pad 434. Consequently, the shield 438 may be configured based on the split yoke P2 430.

In addition, each portion 431A and 431B of the yoke 431 has a separate coil 426A and 426B, respectively, that may be considered part of the split coil 426. Moreover, the split coil 426 is soleniodal, rather than a pancake coil as in the PMR heads 100, 200, and 300. Because the yoke length of the P2 430 is reduced, the overall length of each of the coils 426A and 426B may also be reduced. The resistance of the split coil 426 may be reduced. Furthermore, the coils 426A and 426B are configured such that each coil 426A and 426B generates a magnetic field in the same direction in the corresponding portions 431A and 431B, respectively, of the yoke 431. Thus, the coils 426A and 426B of the split coil 426 operate together to magnetize the PMR pole 432 in the same direction. Consequently, the PMR pole 432 may still write the desired data to the media (not shown).

The PMR head 400 operates in an analogous manner to the PMR heads 100, 200, and 300. In order to write data to the media (not shown), the split coil 426 is energized. Current is driven through coils 426A and 426B such that magnetic fields in the same direction at P2 430 and the PMR pole 432 are generated. Consequently, the portions 431A and 431B of the split yoke 431 are magnetized in the same direction. Thus, the PMR pole 432 is magnetized and the media written by flux from the pole tip of the PMR pole 432. Based on the direction of current through the coils 426A and 426B, the direction of magnetic flux through the PMR pole 432 changes. Thus, bits having opposing magnetization can be written and the desired data stored on the PMR media.

For reasons analogous to those discussed above with respect to the PMR heads 100, 200, and 300, the PMR head 400 may be more suitable for use at high data rates and may have improved reliability. In particular, the field rise time, dynamic response time, and pole tip protrusion may be reduced. Consequently, higher data rates, for example beyond one gigabit per second, may be achieved. The PMR head 400, therefore, may have improved ability to be used at a high data rate and improved reliability.

Figure 11:
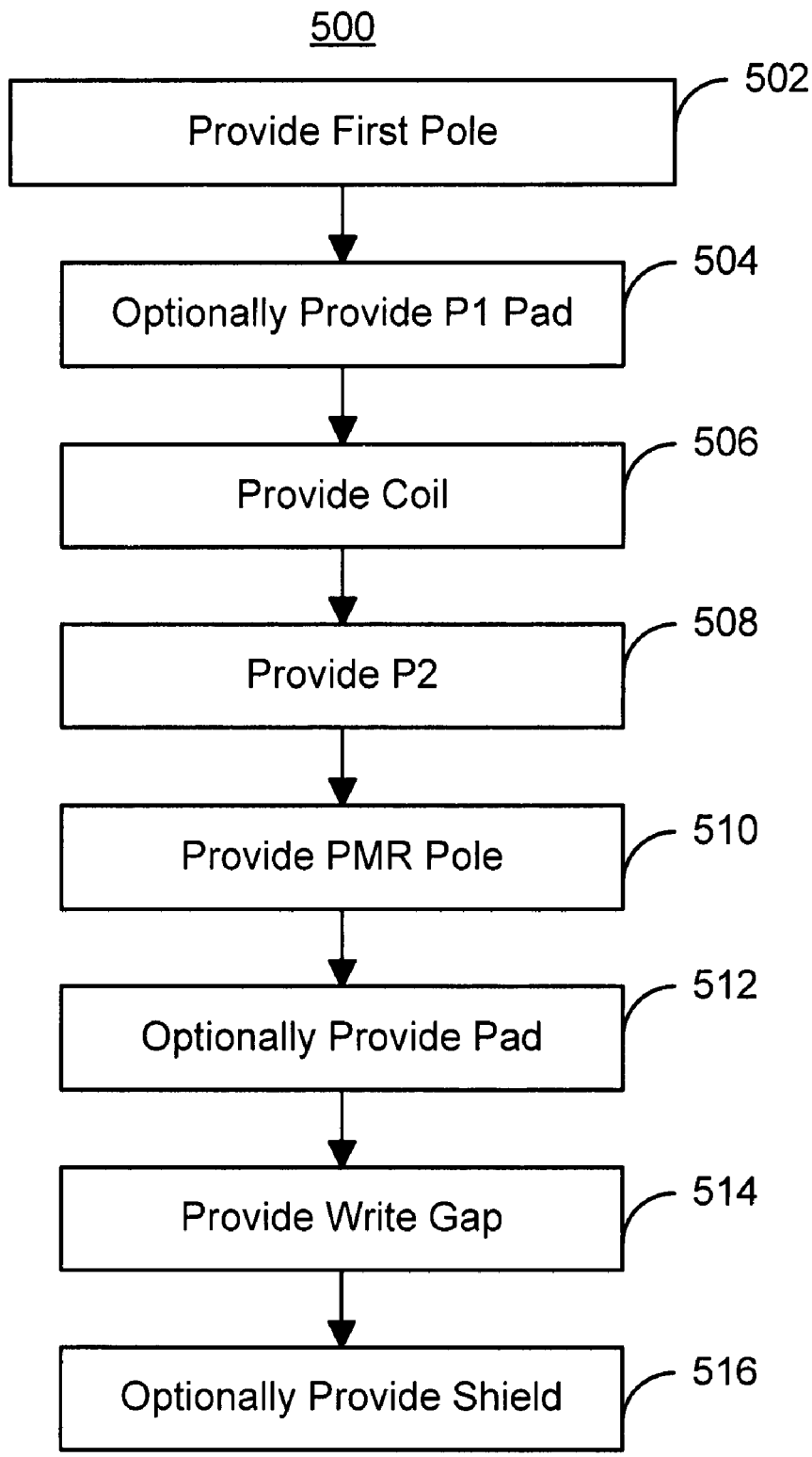
FIG. 11 is a flow chart depicting an exemplary embodiment of a method for providing a PMR write head.

FIG. 11 is a flow chart depicting an exemplary embodiment of a method 500 for providing a PMR write head. For simplicity, steps in the method 500 may be skipped or merged. For clarity, the method 500 is described in the context of the PMR heads 100/200/300/400. Referring to FIGS. 3-11, the P1 122/222/322/422 is provided, via step 502. The P1 pad 128/228/328/428 may optionally be provided, via step 504. The split coil 126/226/326/426 is provided, via step 506. Thus, separate coils 126A and 126B/226A and 226B/326A and 326B/426A and 426B are provided. Thus, either pancake coils 126A and 126B/226A and 226B/326A and 326B or solenoidal coil 426A and 426B may be provided. The split yoke P2 130/230/330/430 is provided, via step 508. Thus, step 508 preferably includes providing a split yoke 131/231/ 431 portions 130A and 130B/231A and 231B/431A and 431B that are physically separate. The PMR pole 132/232/ 332/432 is provided, via step 510. The pad 134/234/334/434 may optionally be provided, via step 512. Step 512 includes providing separate portions 134A and 134B/234A and 234B/ 334A and 334B/434A and 434B. The write gap 136/236/336/ 436 is provided, via step 514. The shield 138/238/338/438 in the desired configuration may optionally be provided, via step 516. Thus, the method 500 can provide the PMR head 100, 200, 300, and/or 400. As a result, a PMR head 100, 200, 300, and/or 400 having improved ability to be used at a high data rate and improved reliability may be provided.

We claim:

1. A magnetic recording transducer having an air-bearing surface (ABS) comprising:
    a first pole having a first front portion at the ABS;
    a write gap;
    a second pole including a second front portion and a split yoke, at least a portion of the write gap residing on the second front portion of the second pole, the split yoke including a first portion and a second portion, the first portion being physically disconnected from the second portion along a direction substantially parallel to the ABS, the first portion having a first front surface and a first back surface, the first front surface being closer to the ABS than the first back surface, the second portion having a second front surface and a second back surface, the second front surface being closer to the ABS than the second back surface, the second front portion connecting the first front surface of the first portion and the second front surface of the second portion, the first portion and the second portion of the split yoke being connected only through the second front portion of the second pole, at least part of the second front portion residing between the split yoke and the ABS;
    a first coil, at least a portion of the first coil residing between the first portion of the split yoke and the first pole; and
    a second coil, at least a portion of the second coil residing between the second portion of the split yoke and the first pole.

2. The magnetic recording transducer of claim 1 further comprising:
    a third pole including a write portion, the write portion residing on the at least the portion of the write gap.

3. The magnetic recording transducer of claim 1 wherein the split yoke has a length of not more than eight micrometers.

4. The magnetic recording transducer of claim 3 wherein the split yoke has a length of not more than six micrometers.

5. The magnetic recording transducer of claim 4 wherein the split yoke has a length of at least four micrometers.

6. The magnetic recording transducer of claim 1 wherein at least one of the first coil and the second coil is a pancake coil.

7. The magnetic recording transducer of claim 1 wherein at least one of the first coil and the second coil is a solenoid coil.

8. The magnetic recording transducer of claim 1 wherein the first coil is configured to generate a first magnetic field in the first portion of the split yoke, the second coil is configured to generate a second field in the second portion of the split yoke, the first field and the second field being in substantially a same direction.

9. The magnetic recording transducer of claim 1 wherein the first coil includes a first plurality of turns and no portion of the first coil resides between the second portion of the yoke and the first pole, and wherein the second coil includes a second plurality of turns and no part of the second coil resides between the first portion of the yoke and the first pole.

10. A magnetic recording transducer having an air-bearing surface (ABS) and comprising:
    a first pole having a first front portion at the ABS;
    a write gap;
    a second pole including a second front portion and a split yoke, at least a portion of the write gap residing on the second front portion of the second pole, the split yoke including a first portion and a second portion, the first portion being physically disconnected from the second portion along a direction substantially parallel to the ABS, the first portion having a first front surface and a first back surface, the first front surface being closer to the ABS than the first back surface, the second portion having a second front surface and a second back surface, the second front surface being closer to the ABS than the second back surface, the second front portion connecting the first front surface of the first portion and the second front surface of the second portion, the first portion and the second portion of the split yoke being connected only through the second front portion of the second pole, at least part of the second front portion residing between the split yoke and the ABS, the split yoke having a yoke length of at least four microns and not more than six microns;

a first coil, at least a portion of the first coil residing between the first portion of the split yoke and the first pole, the first coil being at least one of a pancake coil and a solenoidal coil; and a second coil, at least a portion of the second coil residing between the second portion of the split yoke and the first pole, the second coil being at least one of a pancake coil and a solenoidal coil;

a third pole including a write portion, the write portion residing on the at least the portion of the write gap.

11. The magnetic recording transducer of claim 10 wherein the first coil includes a first plurality of turns and no portion of the first coil resides between the second portion of the yoke and the first pole, and wherein the second coil includes a second plurality of turns and no part of the second coil resides between the first portion of the yoke and the first pole.

12. A magnetic recording head comprising:

a slider; and a magnetic recording transducer integrated with the slider and having an air-bearing surface (ABS), the magnetic recording transducer including a first pole, a write gap, a second pole, a first coil, and a second coil, the first pole having a first front portion, the second pole including a second front portion and a split yoke, at least a portion of the write gap residing on the second front portion of the second pole, the split yoke including a first portion and a second portion, the first portion having a first front surface and a first back surface, the first front surface being closer to the ABS than the first back surface, the second portion having a second front surface and a second back surface, the second front surface being closer to the ABS than the second back surface, at least a portion of the first coil residing between the first portion of the split yoke and the first pole, and at least a portion of the second coil residing between the second portion of the split yoke and the first pole, the first portion being physically disconnected from the second portion along a direction substantially perpendicular to the ABS, the second front portion connecting the first front surface of the first portion and the second front surface of the second portion, the first portion and the second portion of the split yoke being connected only through the second front portion of the second pole, at least part of the second front portion residing between the split yoke and the ABS.

13. The magnetic recording head of claim 12 further comprising:

a third pole including a write portion, the write portion residing on the at least the portion of the write gap.

14. The magnetic recording head of claim 12 wherein the split yoke has a length of not more than eight micrometers.

15. The magnetic recording head of claim 14 wherein the split yoke has a length of not more than six micrometers.

16. The magnetic recording head of claim 15 wherein the split yoke has a length of at least four micrometers.

17. The magnetic recording head of claim 12 wherein at least one of the first coil and the second coil is a pancake coil.

18. The magnetic recording head of claim 12 wherein at least one of the first coil and the second coil is a solenoid coil.

19. The magnetic recording head of claim 12 wherein the first coil is configured to generate a first magnetic field in the first portion of the split yoke, the second coil is configured to generate a second field in the second portion of the split yoke, the first field and the second field being in substantially a same direction.

20. The magnetic recording head of claim 12 wherein the first coil includes a first plurality of turns and no portion of the first coil resides between the second portion of the yoke and the first pole, and wherein the second coil includes a second plurality of turns and no part of the second coil resides between the first portion of the yoke and the first pole.

* * * * *